United States Patent
Berger et al.

(10) Patent No.: US 8,584,346 B2
(45) Date of Patent: Nov. 19, 2013

(54) METHOD FOR PRODUCING A BAR WINDING FOR THE STATOR OF AN ELECTRIC MACHINE

(75) Inventors: Thomas Berger, Ditzingen (DE); Christoph Schwarzkopf, Walheim (DE)

(73) Assignee: Robert Bosch GmbH, Stutgart (DE)

( * ) Notice: Subject to any disclaimer, the term of this patent is extended or adjusted under 35 U.S.C. 154(b) by 815 days.

(21) Appl. No.: 12/296,039

(22) PCT Filed: Apr. 10, 2007

(86) PCT No.: PCT/EP2007/053440
§ 371 (c)(1),
(2), (4) Date: Oct. 3, 2008

(87) PCT Pub. No.: WO2007/125010
PCT Pub. Date: Nov. 8, 2007

(65) Prior Publication Data
US 2009/0100665 A1    Apr. 23, 2009

(30) Foreign Application Priority Data

Apr. 26, 2006  (DE) .......................... 10 2006 019 312

(51) Int. Cl.
*H02K 15/09* (2006.01)
(52) U.S. Cl.
USPC ........... 29/596; 219/78.01; 219/156; 310/201
(58) Field of Classification Search
CPC ................................................ H02K 15/0081
USPC ............ 29/596, 598; 219/56, 56.1, 26.22, 58, 219/78.01, 156; 310/201
See application file for complete search history.

(56) References Cited

U.S. PATENT DOCUMENTS

| | | | |
|---|---|---|---|
| 2,300,700 A | 11/1942 | Porter et al. | |
| 4,032,057 A | 6/1977 | Linscott, Jr. | |
| 6,698,083 B2 * | 3/2004 | Tokizawa et al. | 29/596 |
| 6,990,724 B2 | 1/2006 | Tamura et al. | |
| 7,564,159 B2 * | 7/2009 | Ooiwa | 310/179 |
| 2002/0041129 A1 | 4/2002 | Oohashi et al. | |
| 2003/0024101 A1 | 2/2003 | Tokizawa et al. | |
| 2006/0001327 A1 | 1/2006 | Ossenkopp et al. | |

FOREIGN PATENT DOCUMENTS

| | | |
|---|---|---|
| DE | 40 31 276 | 4/1992 |
| DE | 103 15 361 | 10/2004 |
| EP | 1 041 696 | 10/2000 |
| EP | 1 128 527 | 8/2001 |
| FR | 2 808 938 | 11/2001 |
| GB | 147790 | 10/1921 |
| JP | 10-210717 | 8/1998 |
| JP | 2002-119003 | 4/2002 |
| JP | 2003-219614 | 7/2003 |

* cited by examiner

*Primary Examiner* — Livius R Cazan
(74) *Attorney, Agent, or Firm* — Michael J. Striker

(57) ABSTRACT

In a method for manufacturing a bar winding for the stator of an electric machine, in particular of a claw pole alternator for motor vehicles, resistance welding is used to form mechanically and electrically reliable and permanent connections in the winding overhang of the stator even with winding configurations that include four or more superposed conductor segments, and even with the very small amount of working space that remains for the necessary connections, using a minimum of production-related outlay. With a design, in particular, of four radially superposed conductor segments in the winding overhang, particularly advantageous configurations result in terms of the placement of the bar ends and in terms of the design of the welding electrodes.

10 Claims, 5 Drawing Sheets

METHOD FOR PRODUCING A BAR WINDING FOR THE STATOR OF AN ELECTRIC MACHINE

CROSS-REFERENCE

The invention described and claimed hereinbelow is also described in PCT/EP2007/001147, filed on Apr. 10, 2007 and DE 10 2006 019 312.1, filed on Apr. 26, 2006. This German Patent Application, whose subject matter is incorporated here by reference, provides the basis for a claim of priority of invention under 35 U.S.C. 119 (a)-(d).

BACKGROUND OF THE INVENTION

The present invention is directed to a method for manufacturing a bar winding for the stator of an electric machine, in particular of a claw pole alternator for motor vehicles, as made known basically in DE 40 31 276 A. This publication discloses a method for manufacturing a stator for electric machines, the bar winding of which is made of four superposed winding bars that lie in slots in pairs, which are pre-bent in the manner of hairpins, and which are inserted into the core slots with a separation corresponding to the pitch between poles. The ends of the winding bars are interlaced on both sides of the core, and they are joined galvanically in pairs on one side of the core via welding or soldering. The publication does not make any detailed statements regarding the method used to join the ends of the winding bars.

SUMMARY OF THE INVENTION

In contrast to the related art, the inventive method makes it possible—by using the method of resistance welding, which is basically known—to create mechanically and electrically reliable and permanent connections in the winding overhang of the stator even with winding configurations that include four or more superposed conductor segments, and even with the very small amount of working space that remains for the necessary connections, using a minimum of production-related outlay. With a design, in particular, of four radially superposed conductor segments in the winding overhang, particularly advantageous configurations result in terms of the placement of the bar ends and in terms of the design of the welding electrodes.

According to a very simple and advantageous method, the electrical connections of two radially superposed conductor pairs in the winding overhang may be created simultaneously or in succession using the electrodes by contacting one conductor segment of each pair radially and at least one conductor segment axially by an electrode, and by redirecting the welding current by 90° in this process.

Advantageously, the outwardly lying conductor segments of two conductor pairs to be connected are each contacted by a separate, radially operating electrode, and the two center conductor segments are contacted by a single, axially operating electrode. This mode of operation is particularly advantageous when the ends of the inwardly lying conductor segments of two conductor pairs extend further out of the core of the stator than do the outer conductor segments, because the inwardly lying conductor segments are then more easily accessible, and because it makes it possible to use a lower-wear electrode with a larger cross section. This mode of operation also makes it possible, without any mechanical reworking, to melt off—using the electrode—ends of the inner conductor segments that extend out of the core of the stator by different extents, in order to make them the same length, and to then contact them.

A particularly advantageous embodiment of the inventive method results when the ends of the inwardly lying conductor segments of two conductor pairs extend further out of the stator core than do the outer conductor segments, and when all conductor segments are contacted radially by the electrodes in the welding process. This method of operation offers the advantage in particular that, during the welding process, no axial forces act on the conductor segments, and the radial forces may be absorbed around the full circumference of the welding electrodes without the need for additional mechanical securing measures.

The inventive method may also be used, advantageously, with a configuration that includes more than four, e.g., six conductor segments in the winding overhang, which are radially superposed and are interconnected in pairs, by axially contacting the ends of all conductor pairs by the electrodes in the welding process. It is also possible, however, to contact the outwardly lying conductor segments of the outer conductor pairs to be connected using one radially operating electrode, in which case, the radially operating electrodes absorb the forces acting in the radial direction during the welding process. As a result, only the axially acting forces need to be absorbed using a separate clamping device.

BRIEF DESCRIPTION OF THE DRAWINGS

Exemplary embodiments of the present invention are presented in the drawing and are described in greater detail in the description below.

DETAILED DESCRIPTION OF THE PREFERRED EMBODIMENTS

Figure 1:
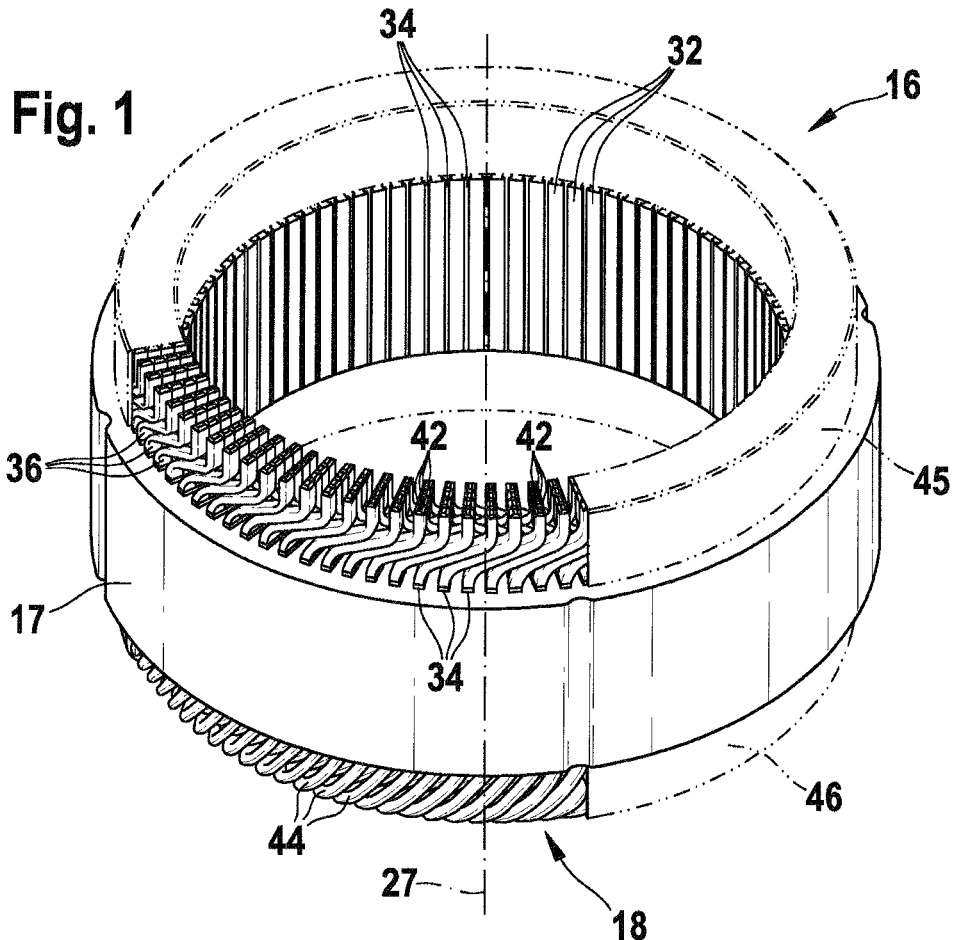
FIG. 1 shows a perspective view of a stator with a bar winding with the ends of the conductor segments, which have been pre-shaped for the welding process.

FIG. 1 shows a perspective, schematic view of a stator 16 of an electric machine of the type used, e.g., in a claw pole alternator for motor vehicles. Poles 32 and slots 34 are shown on the inner surface of stator 16. Each slot 34 contains four radially superposed conductor segments 36. The conductor segments are bent in the shape of hairpins in a known manner on the underside of stator 16, and they are interlaced across one pole pitch. Their free ends 42, which are of equal length, extend out of the top side of stator 16—also having been interlaced across one pole pitch—out of slots 34, and they are located in four concentric rows. After the electric machine has been assembled, free ends 42 are located in drive-side winding overhang 45 of the stator, while hairpin-shaped redirections 44 extend out of opposite winding overhang 46 of stator 16, which is oriented toward its connection side after the electric machine has been assembled. This design has the advantage that more space for the welded connections is available in drive-side winding overhang 45. Machine axis is labeled with reference numeral 27.

Figure 2:
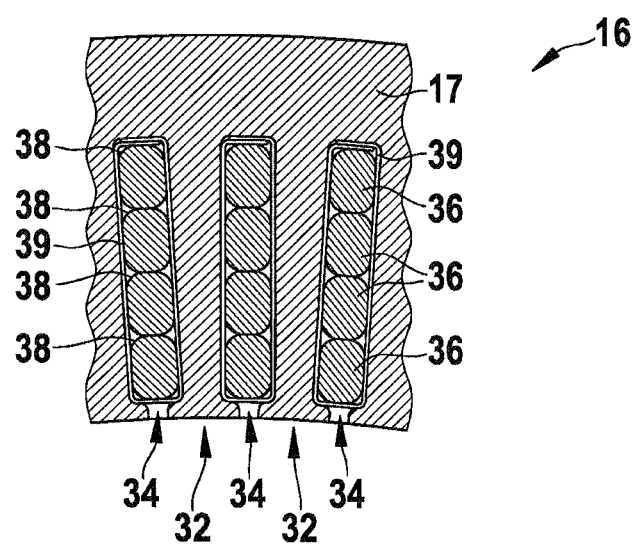
FIG. 2 shows a partial cross section through the stator core with radially extending slots, each of which contains four superposed conductor segments.

FIG. 2 shows an enlarged illustration of a cross-section through core 17 of stator 16. Four conductor segments 36 are radially superposed in each slot 34. The conductor segments are insulated—on each of their surfaces by a lacquer insulation 38, and altogether by insulation inlays 39—against core 17 of stator 16. Conductor segments 36 of stator winding 18 designed as a bar winding are inserted by axially inserting conductor segments 36 into slots 34.

Figure 3A:
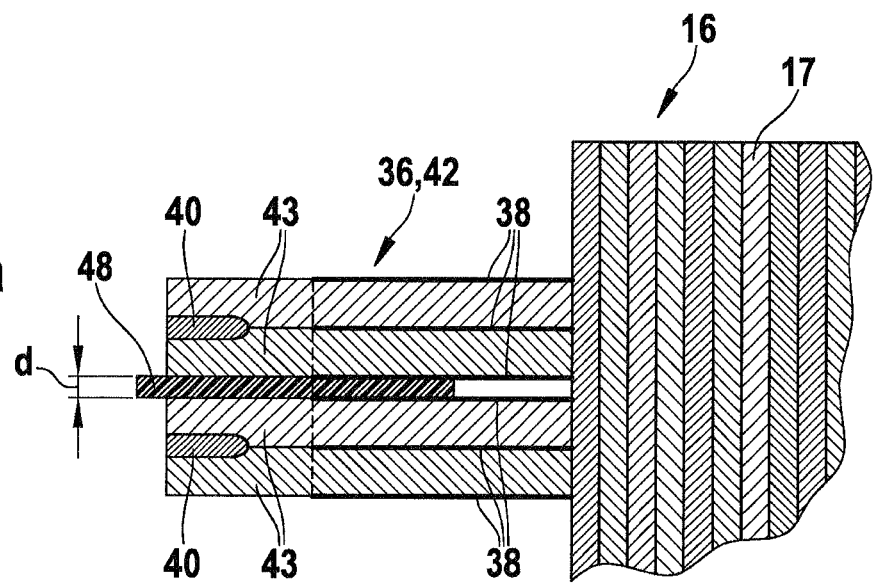
FIG. 3a is a schematic cross-sectional view with four conductor segments in the winding overhang of the stator, which are superposed and have been welded together in pairs.

FIG. 3 shows, in illustration a, a schematicized, partial cross sectional view through core 17 of stator 16, out of which free ends 42 of stator winding 18 extend. Ends 42 of stator winding 18 are stripped of lacquer insulation 38 in front region 43, so that the welding current may flow unhindered in this region in the radial and axial directions and fuse a welding area 40. A distance d is left between ends 42 of conductor segments 36 that are not to be welded, into which a strip-type insulation 48 may also be inserted, e.g., a strip of plastic or ceramic.

Figure 3B:
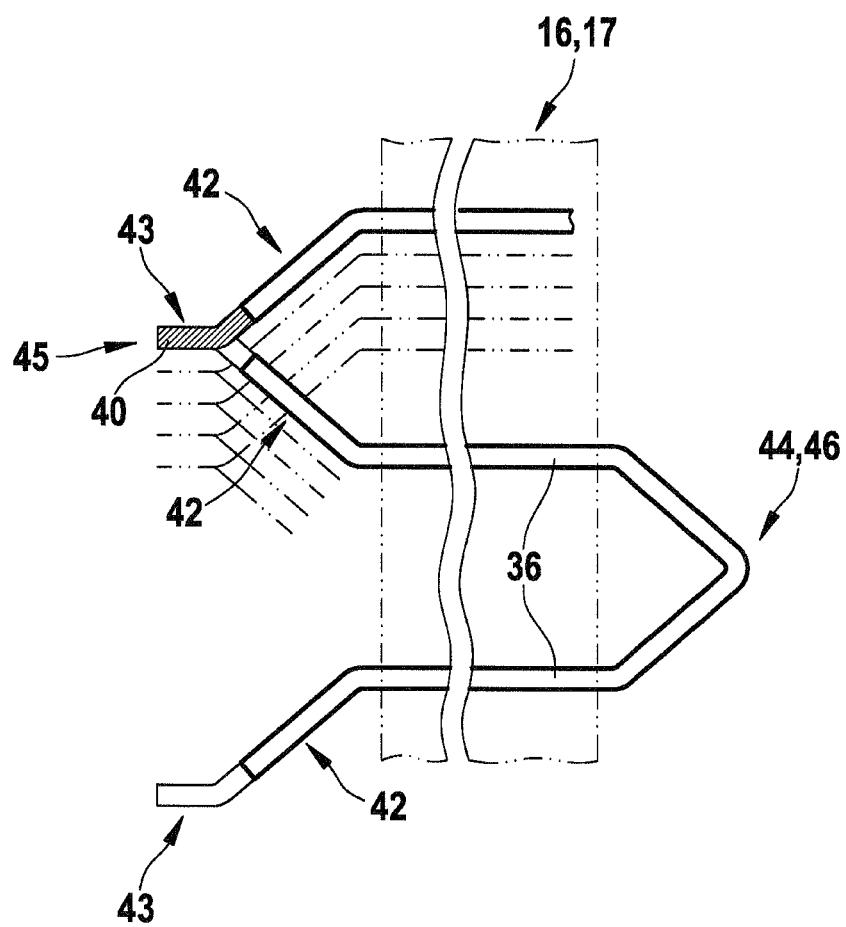
FIG. 3b shows a schematic illustration of a wave winding with a welded connection of a conductor pair.

FIG. 3b shows hairpin-shaped reversal 44 between conductor segments 36 in the region of winding overhang 46 facing away from the drive side, the spread of conductor segments 36 by one pole pitch, and the offset of free ends 42 toward welding areas 40. The inventive welding of ends 42, the various possible designs of welding electrodes, and the placement of ends 42 in welding area 40 will be discussed in greater detail with reference to the figures below.

Figure 4:
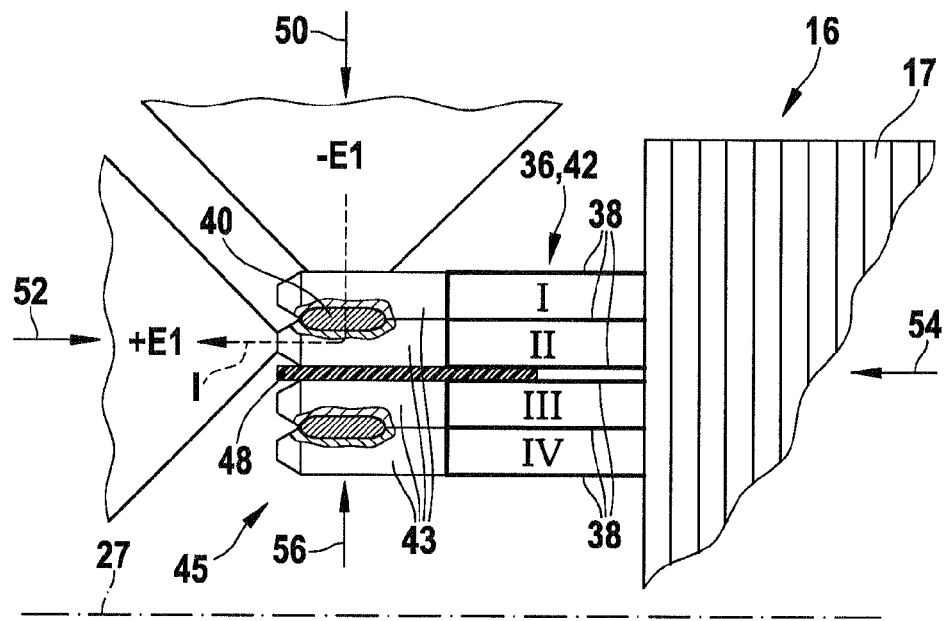
FIG. 4 shows a design with four conductor segments—which are of equal length, are superposed, and are to be connected in pairs—in the winding overhang.
Figure 6:
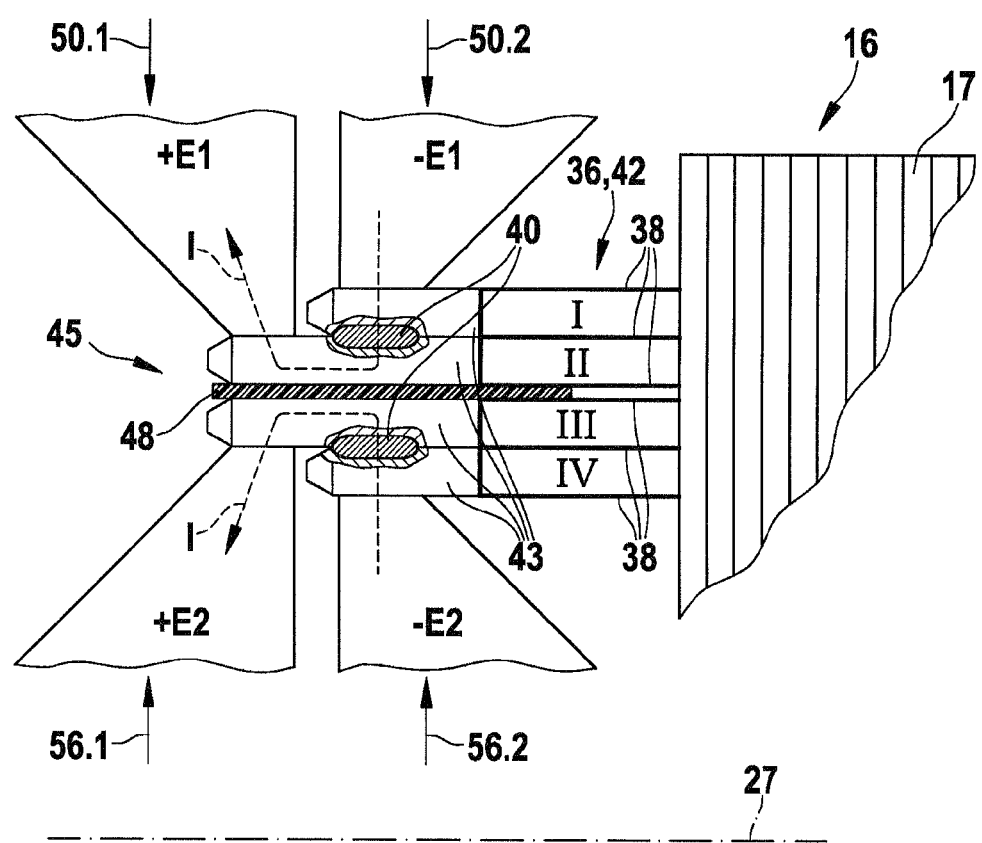
FIG. 6 shows a design according to FIG. 5 with only radial contacting of the ends of the conductor segments.
Figure 7:
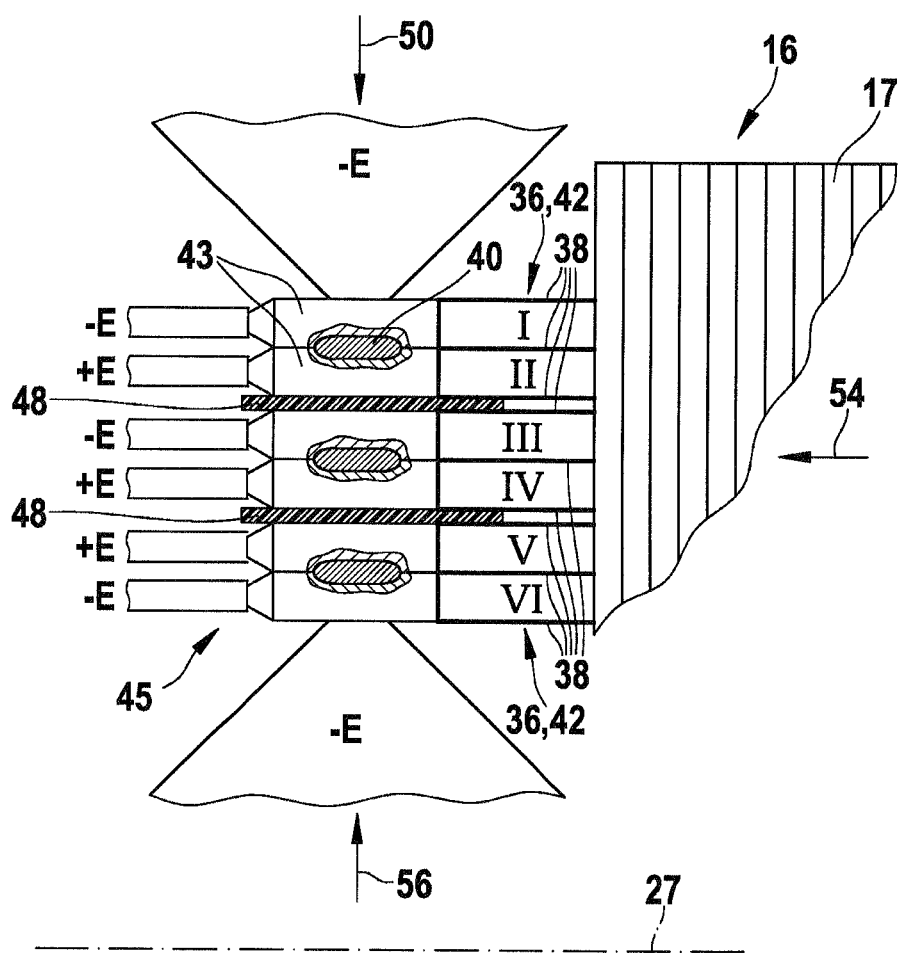
FIG. 7 shows a design with six conductor segments—which superposed and are connected in pairs—in a slot and in the winding overhang.

FIG. 4 shows a design with four conductor segments 36—which are radially superposed and are welded together in pairs—in a drive-side winding overhang 45, the stripped ends 43 of which extend out of core 17 of stator 16 to equal extents and terminate in winding overhang 45 at the same level. Individual conductor segments 36 are labeled as I, II, III and IV. Conductor segments I and II, and III and IV are welded together in region 40. An insulation 48 is inserted between conductor segments II and III. Conductor segment I is contacted radially by negative welding electrode −E1, and conductor segment II is contacted axially on its end face by positive electrode +E1. Welding current I from electrode −E1 initially flows through conductor segment I, then it reverses its direction of flow, into an axial direction toward positive electrode +E1. In this manner, conductor segments I and II to be welded together, and, in the same manner, conductor segments III and IV, may be easily contacted using welding electrodes that are sufficiently sturdy and therefore permanent, and that have the service lives required in production. At the same time, the clamping forces for positioning and stabilizing conductor segments 36 during the welding process are absorbed from the outside in the radial direction by the −E1 electrodes, and they are absorbed from the winding overhang-side in the axial direction, as indicated by arrows 50 and 52. The contact pressures produced during welding must be absorbed—from stator 18 and the inner side of the winding overhang outward—by additional mechanical devices, which are not shown, as indicated by arrows 54 and 56. The spacial orientation of the configuration shown in FIG. 4 is also indicated in FIGS. 5 through 7 via central axis 27 of the machine.

Figure 5:
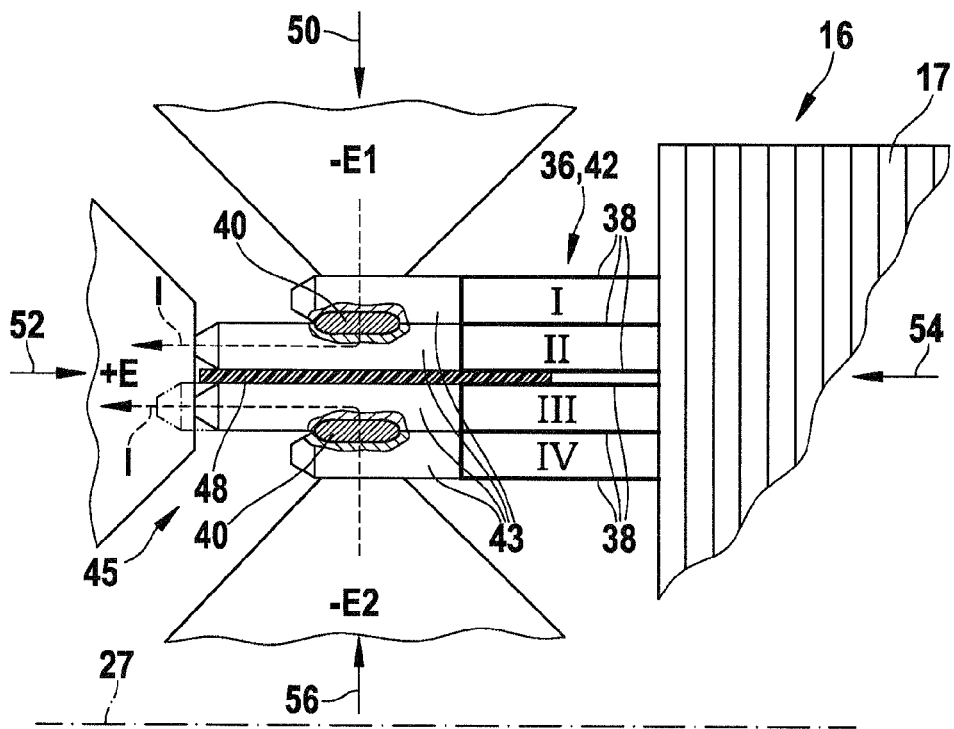
FIG. 5 shows a design with four conductor segments—which are radially superposed and are to be connected in pairs—in the winding overhang, the two middle segments extending out of the stator core further than do the outer segments.

FIG. 5 also shows a design with four conductor segments—which are radially superposed and are welded together in pairs—in drive-side winding overhang 45, the two middle segments II and III extending out of the core 17 further than do outer segments I and IV. Conductor segments I and IV are contacted from the outside in the radial direction by electrode −E1, and from the inside by electrode −E2. Conductor segments II and IV are contacted by one electrode +E in the axial direction on the end face of conductor segments 36. Welding current I initially flows from negative electrodes −E1 and −E2 in the radial direction through conductor segments I and IV, and it is redirected in region 40 of the weld points into the axial direction toward positive welding electrode +E. The two conductor pairs I and II, and III and IV may be welded simultaneously. Any uneven axial lengths of the two conductor segments II and III may be compensated for by positive electrode +E by using the electrode to melt off a longer conductor segment, as indicated with segment III, before conductor segments II and III are contacted and welded connections 40 are created. With this design, the mechanical arresting forces need only be absorbed during the welding process in the region of core 17, as indicated by arrow 54. The remaining positioning and arresting forces 50, 52 and 56 are absorbed by the electrodes themselves without the use of any additional design-related measures.

The procedure of contacting conductor segments II and III using a single electrode +E, as shown in FIG. 5, may also be used with the design according to FIG. 4 to contact middle conductor segments II and III. In this case, negative electrode −E1 could be moved toward conductor segment IV, or an additional electrode −E2 could be used with this design to contact conductor segment IV.

With the design depicted in FIG. 4, any differences in length between conductor segments 36 may then also be compensated for via melting, and/or the welding process may be carried out for both conductor pairs in one working step.

FIG. 6 shows the same configuration of conductor segments 36 as in FIG. 5. To contact ends 43 when welding pairs of conductor segments I and II, and conductor segments III and IV, however, four separate electrodes −E1/+E1 and −E2/+E2 are only used radially. Welding current I is redirected twice, from a radial direction, to an axial direction, and then back to a radial direction, with all conductor segments being easily accessible. The arresting forces for the conductor segments, which only occur in the radial direction, are absorbed exclusively by the welding electrodes, as indicated by arrows 50.1 and 50.2, and 56.1 and 56.2. With this configuration, no axial forces are applied to conductor segments 36.

FIG. 7 shows a design with six radially superposed conductor segments I through VI in drive-side winding overhang 45. Conductor segments I through VI are interconnected in pairs in the region of weld points 40 by inserting insulation 48 at their free and stripped ends 43. Different possibilities are shown schematically for positioning welding electrodes −E and +E. Outer conductor segments I and VI are preferably contacted by radially applied welding electrodes −E. Likewise, these conductor segments I and VI may also be contacted axially, as shown for the remaining conductor segments II, III, IV, and V. A further alternative, which is not shown, would also be, e.g., to extend conductor segments IV and V axially, and to contact them radially or axially, as indicated in FIGS. 5 and 6. When radially-located welding electrodes −E are used, they may absorb radial arresting forces 50 and 56 during the welding process. When axially contacting some or all conductor segments, the necessary positioning and arresting forces must be absorbed from the side of core 17, as indicated by arrow 54, using suitable clamping means for core 17.

Electric machines, in particular claw pole alternators for motor vehicles, with a stator winding 18 with a bar or plug-in winding design, have very good ventilation of winding overhangs 45 and 46, and they produce relatively little noise, even at high rotational speeds. With the measures provided, considerable manufacturing-related advantages result with the manufacture of stators 16 of this type, since the welding processes are greatly simplified and improved, thereby even making it possible to use the resistance-welding method—which is very advantageous—with many applications. In addition, mechanical arresting and positioning means may be eliminated to a large extent or entirely, and the electrodes—which are subject to a great deal of wear—are designed to be sturdy and, therefore, long-lived when the design is selected according to the present invention such that the direction of current flow and the direction of the force to be applied in the welding process are separated from each other, at least partially. Via the axial offset of the location of conductor segments 36, additional space is created for the configuration and accessibility of the welding electrodes.

Via the possibility of using robust and large welding electrodes, it also becomes easier to supply higher welding currents I, which results in shorter contacting times and less warming. As a result, the insulation of conductor segments 36 is less at risk to the effects of heat. In the welding region, contacts between adjacent conductor segments may be reliably prevented by using additional inlays of insulation elements 48, which are removed after welding. As a result, faulty contactings between conductor segments 36 do not occur in the welding zone. In addition, insulations 48 may transfer force in the region of the central conductor segments by manufacturing them using a suitable material, e.g., a suitable plastic or ceramic.

What is claimed is:

1. A method for producing a bar winding (18) for a stator (16) of an electric machine, which is a claw pole alternator for motor vehicles, which includes at least four conductor segments (I through VI; 36) in every winding overhang (45, 46), which are radially superposed and are to be interconnected in pairs, wherein the stator (16) has an annular-cylindrical core (17) with a machine axis (27) and wherein the core (17) has grooves (34) open radially inward toward the machine axis, wherein said conductor segments are inserted in grooves (34) of the core (17) in a direction of the machine axis (27), comprising the following steps:

forming a welded connection by connecting ends (42) of the conductor segments (I through VI; 36) via resistance welding, wherein said welding produces a welded connection that is positioned directly between two radial arresting forces;

providing at least one electrode (±E, ±E1, ±E2); wherein said resistance welding is accomplished by providing said at least one electrode, wherein said at least one electrode simultaneously controls a mechanical positioning (50, 50.1, 50.2, 52, 56, 56.1, 56.2) and current supply of the ends (42) of the conductor pairs (I, II; III, IV; V, VI) to be connected, such that a welding current (I) is guided through ends (42) of the conductor pairs (I, II; III, IV; V, VI) to be connected in a partially radial manner and in a partially axial manner relative to the machine axis (27), wherein after insertion of the conductor segments, an insulation (48) is mounted between a first pair of conductor segments (I-VI; 36) to be connected to one another and a second pair of conductor segments (I-VI; 36) to be connected to one another, and thereafter, the at least one electrode produces clamping forces in the radial direction on the insulation (48) between the first pair of conductor segments (I-VI; 36) to be connected to one another and the second pair of conductor segments (I-VI; 36) to be connected to one another.

2. The method as recited in claim 1, wherein, of two conductor pairs (I, II; III, IV) to be connected, one conductor segment (I, IV) is contacted radially, and at least one conductor segment (II, III) is contacted axially by at least one electrode (±E1, −E2, +E).

3. The method as recited in claim 1, wherein the outwardly lying conductor segments (I, IV) of two conductor pairs (I, II; III, IV) to be connected are each contacted by a separate, radially operating electrode (−E1, −E2), and the two central conductor segments (II, III) are contacted by one axially operating electrode (+E).

4. The method as recited in claim 1, wherein the ends of the inwardly lying conductor segments (II, III) of two conductor pairs (I, II; III, IV) extend further out of the core (17) of the stator (16) than do the outer conductor segments (I, IV), and they are contacted by one electrode (+E).

5. The method as recited in claim 4, wherein ends of the inner conductor segments (II, III) that extend out of the core of the stator (16) to different extents are contacted by one electrode (+E) after the overhang of a longer end has been melted off.

6. The method as recited in claim 1, wherein the ends (42) of all conductor segments (I through VI) of the conductor pairs (I, II; III, IV; V, VI) are contacted axially by electrodes (±E) in the welding process.

7. The method as recited in claim 1, wherein the ends (42) of the outwardly lying conductor segments (I, VI) of conductor pairs (I, II; III, IV; V, VI) to be connected are each contacted by a radially operating electrode (−E), and the central conductor segments (II through V) are each contacted by an axially operating electrode (±E).

8. The method as recited in claim 1, wherein the ends (42) to be connected of the conductor segments (I through VI) are located with axial electrical contact with each other, and they are positioned and held in place mechanically at least in the radial direction (50, 56) by the electrodes (±E) during the welding process.

9. A method for producing a bar winding (18) for the stator (16) of an electric machine, which is a claw pole alternator for motor vehicles, which includes at least four conductor segments (I through IV; 36) in every winding overhang (45, 46), which are radially superposed and are interconnected in pairs, wherein the stator (16) has an annular-cylindrical core (17) with a machine axis (27) and wherein the core (17) has grooves (34) open radially inward toward the machine axis, wherein said conductor segments are inserted in grooves (34) of the core (17) in a direction of the machine axis (27), comprising the following steps:

forming a welded connection by connecting ends (42) of the conductor segments (I through IV; 36) via resistance welding;

providing at least one electrode (±E1, ±E2), wherein said resistance welding is accomplished by providing said at least one electrode, wherein said at least one electrode simultaneously controls a mechanical positioning (50.1, 50.2, 56.1, 56.2) and current supply of the ends (42) of the conductor pairs (I, II; III, IV) to be connected, such that a welding current (I) is guided through ends (42) of the conductor pairs (I, II; III, IV) to be connected in a partially radial manner and in a partially axial manner relative to the machine axis (27), wherein the ends (42) of the inwardly lying conductor segments (II, III) of two conductor pairs (I, II; III, IV) extend further out of the core (17) of the stator (16) than do the outer conductor segments (I, IV), and each conductor segment (I through IV) is contacted radially by at least one electrode (±E1, ±E2) in the welding process, wherein after insertion of the conductor segments, an insulation (48) is mounted between a first pair of conductor segments (I-IV; 36) to be connected to one another and a second pair of conductor segments (I-IV; 36) to be connected to one another, and thereafter, electrodes produce clamping forces in the radial direction on the insulation (48) between the first pair of conductor segments (I-IV; 36) to be connected to one another and the second pair of conductor segments (I-IV; 36) to be connected to one another.

10. The method as recited in claim 9, wherein said welded connection is positioned directly between two radial arresting forces.

\* \* \* \* \*